(12) United States Patent
Matsushima et al.

(10) Patent No.: US 9,162,587 B2
(45) Date of Patent: Oct. 20, 2015

(54) ELECTRIC VEHICLE

(75) Inventors: Hirohide Matsushima, Kobe (JP);
Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/353,769

(22) PCT Filed: Oct. 24, 2011

(86) PCT No.: PCT/JP2011/005944
§ 371 (c)(1),
(2), (4) Date: Jul. 11, 2014

(87) PCT Pub. No.: WO2013/061359
PCT Pub. Date: May 2, 2013

(65) Prior Publication Data
US 2014/0336858 A1 Nov. 13, 2014

(51) Int. Cl.
| | |
|---|---|
| *B60L 15/20* | (2006.01) |
| *B62J 99/00* | (2009.01) |
| *B62K 11/06* | (2006.01) |
| *B62M 11/06* | (2006.01) |
| *B60L 11/18* | (2006.01) |

(52) U.S. Cl.
CPC ......... *B60L 15/2054* (2013.01); *B60L 11/1881* (2013.01); *B62K 11/06* (2013.01); *B62M 11/06* (2013.01); *B60L 2200/12* (2013.01); *B60L 2200/32* (2013.01); *B60L 2240/12* (2013.01); *B60L 2240/14* (2013.01); *B60L 2240/421* (2013.01); *B60L 2240/423* (2013.01); *B60L 2240/461* (2013.01); *B60L 2240/486* (2013.01); *B60L 2240/507* (2013.01); *B60L 2240/80* (2013.01); *B60L 2250/28* (2013.01); *B60L 2270/145* (2013.01); *B62K 2204/00* (2013.01); *B62M 2701/0046* (2013.01); *B62M 2701/0092* (2013.01); *Y02T 10/642* (2013.01); *Y02T 10/7275* (2013.01); *Y02T 90/34* (2013.01)

(58) Field of Classification Search
CPC ..................... B62M 11/06; B62M 2701/0092; B62M 2701/0046; B62K 11/06; B62K 2204/00; B60L 15/2054; B60L 2240/423; Y02T 10/642
See application file for complete search history.

(56) References Cited

U.S. PATENT DOCUMENTS

| | | | | |
|---|---|---|---|---|
| 5,884,201 | A | * | 3/1999 | Kawai .............................. 701/22 |
| 7,468,018 | B2 | * | 12/2008 | Radich ............................. 477/78 |
| 2002/0060114 | A1 | * | 5/2002 | Maruyama ................... 192/3.63 |

FOREIGN PATENT DOCUMENTS

| | | | |
|---|---|---|---|
| JP | 07007815 | A | 1/1995 |
| JP | 07059214 | A | 3/1995 |
| JP | 08168110 | A | 6/1996 |
| JP | 10-174209 | * | 6/1998 |
| JP | 3208928 | B | 9/2001 |
| JP | 2003-199214 | * | 7/2003 |

* cited by examiner

*Primary Examiner* — Michael J Zanelli
(74) *Attorney, Agent, or Firm* — Alleman Hall McCoy Russell & Tuttle LLP

(57) ABSTRACT

An electric vehicle comprises an electric motor; a manual transmission which selects one driving power transmission path and shifts a present driving power transmission path to the selected driving transmission path, in response to a rider changing a speed of the electric motor; a shifting state detecting device for detecting whether the manual transmission is in a driving power transmission state or in a driving power cut-off state; and a motor controller for executing a first control routine to control the electric motor; wherein in the first routine, torque control of the electric motor is performed when the manual transmission is detected to be in the driving power transmission state, and mitigation control of the electric motor is performed to mitigate an impact caused by shifting, when the manual transmission is detected to be in the driving power cut-off state, the mitigation control being different from the torque control.

10 Claims, 8 Drawing Sheets

⟨During low-speed driving⟩

| | | Main clutch | |
|---|---|---|---|
| | | Transmission state | Cut-off state |
| Transmission | Transmission state | Torque control | |
| | Cut-off state | Rotational speed control | |

Fig.5

⟨During high-speed driving⟩

| | | Main clutch | |
|---|---|---|---|
| | | Transmission state | Cut-off state |
| Transmission | Transmission state | Torque control | |
| | Cut-off state | Rotational speed control | |

Fig.6

ELECTRIC VEHICLE

TECHNICAL FIELD

The present invention relates to an electric vehicle incorporating a manual transmission which changes the speed of driving power from an electric motor.

BACKGROUND ART

As a conventional example, there has been proposed an electric car, in which when a clutch interposed between an electric motor and a manual transmission is disengaged, the rotational speed of the electric motor is controlled so that it matches the rotational speed of a clutch disk at a wheel side, while when the clutch is engaged, the torque of the electric motor is controlled so that torque corresponding to a depression amount of an accelerator pedal is generated (see, e.g., Patent Literature 1).

CITATION LIST

Patent Literature

Patent Literature 1: Japanese Patent Publication No. 3208928

SUMMARY OF INVENTION

Technical Problem

However, even in the above described configuration, if a rider performs a shifting operation of the manual transmission with the clutch engaged, or a clutch operation in the shifting operation is improper, the rotational speed control cannot be performed properly, and a shifting shock is generated.

Accordingly, an object of the present invention is to mitigate the shifting shock irrespective of the rider's operation even in the electric vehicle incorporating the manual transmission.

Solution to Problem

An electric vehicle of the present invention comprises an electric motor for generating driving power transmitted to a drive wheel via a driving power transmission path; a manual transmission which selects one driving power transmission path from among plural driving power transmission paths and shifts a present driving power transmission path to the selected driving transmission path, in response to a rider's operation for changing a speed of the driving power from the electric motor; a shifting state detecting device for detecting whether the manual transmission is in a driving power transmission state in which the manual transmission has completed shifting of the driving power transmission path or in a driving power cut-off state in which the manual transmission is shifting the driving power transmission path; and a motor controller for executing a first control routine to control the electric motor; wherein in the first routine, torque control of the electric motor is performed when the shifting state detecting device detects that the manual transmission is in the driving power transmission state, and mitigation control of the electric motor is performed to mitigate an impact caused by shifting of the driving power transmission path, when the shifting state detecting device detects that the manual transmission is in the driving power cut-off state, the mitigation control being different from the torque control.

In accordance with this configuration, even when a shifting operation is performed, in a state in which a portion of the driving power transmission path which is other than the manual transmission is in a connected state in which the driving power can be transmitted, the electric motor is controlled so that an impact caused by shifting of the driving power transmission path can be mitigated. Therefore, in the electric vehicle including the manual transmission, the impact caused by the shifting operation can be mitigated. For example, in a case where the electric vehicle includes a clutch in a location between the electric motor and the manual transmission, the impact caused by the shifting operation can be mitigated even if the shifting is performed in a state in which the clutch is maintained to be engaged. In addition, the impact caused by the shifting operation can be also mitigated in a case where the electric vehicle does not include a clutch between the electric motor and the manual transmission.

The electric vehicle may further comprise an estimating device for estimating the driving power transmission path to which the present driving power transmission path is to be shifted, when the shifting state detecting device detects that the manual transmission is in the driving power cut-off state; and the mitigation control may be rotational speed control of the electric motor based on a reduction gear ratio in the estimated driving power transmission path of the manual transmission, and a rotational speed of a rotary member which is located downstream of a shifting location of the driving power transmission path of the manual transmission, in a driving power transmission direction.

In accordance with this configuration, it becomes possible to lessen an angular velocity difference between the rotary members joined to each other in a shifting location of the manual transmission just after the driving power transmission path has been shifted in the manual transmission. As a result, the impact can be suitably mitigated.

In the rotational speed control, the electric motor may be controlled such that the rotational speed is reduced when the reduction gear ratio estimated by the estimating device is lower than the reduction gear ratio before shifting of the driving power transmission path, and the electric motor may be controlled such that the rotational speed is increased when the reduction gear ratio estimated by the estimating device is higher than the reduction gear ratio before shifting of the driving power transmission path.

In accordance with this configuration, the impact caused by the shifting operation can be suitably mitigated according to an increase/decrease in the reduction gear ratio which is caused by shifting of the driving power transmission path.

The electric vehicle may further comprise: a clutch which is capable of inhibiting the driving power from being transmitted between the electric motor and the manual transmission; and the motor controller may be capable of executing the first control routine irrespective of an operation state of the clutch.

In accordance with this configuration, since switching between the torque control and the rotational speed control can be performed based on the operation (manipulation) state of the manual transmission rather than the operation state of the clutch, the impact caused by the shifting operation can be mitigated even if the clutch operation in the shifting is improper. Furthermore, if the manual transmission is in the driving power transmission state even when the clutch is in the driving power cut-off state, the torque of the electric motor can be controlled. Therefore, the torque of the electric motor can be adjusted according to the rider's intention even when the clutch is in the driving power cut-off state. This makes it possible to increase the torque of the motor in advance when the clutch is in the driving power cut-off state, to improve acceleration responsiveness, for example, when the clutch is returned to the driving power transmission state.

The electric vehicle may further comprise a clutch which is capable of inhibiting the driving power from being transmitted between the electric motor and the manual transmission; and a clutch determiner device for determining whether the clutch is in the driving power transmission state or in the driving power cut-off state; and the motor controller may execute the first control routine when the clutch determiner device determines that the clutch is in the driving power transmission state, and execute a second control routine when the clutch determiner device determines that the clutch is in the driving power cut-off state, and the motor controller may perform the rotational speed control of the electric motor in the second control routine.

In accordance with this configuration, since the rotational speed of the electric motor is controlled when the clutch is moved to the driving power cut-off state in the middle of the shifting operation, the impact caused by the shifting operation when the clutch is returned to the driving power transmission state can be mitigated stably. Even in a case where the clutch is not operated properly in the shifting operation, the impact caused by the shifting operation can be mitigated by executing the first control routine.

The motor controller may perform switching between the first control routine and the second control routine based on an operation state of the clutch when it is detected that a driving state satisfies a predetermined impact mitigation priority condition, and may execute the first control routine irrespective of the operation state of the clutch when it is detected that the driving state satisfies a predetermined torque priority condition.

In accordance with this configuration, whether or not to consider the state of the clutch for determination as to selection of the control routine can be changed according to the driving state. When the driving state satisfies the impact mitigation priority condition, the rotational speed control is adequately performed according to the clutch state, and thereby the impact caused by the shifting operation can be mitigated by priority. When the driving state satisfies the torque priority condition, the state of the clutch is not considered so that the period of the rotational speed control can be made as short as possible, and the period of the torque control corresponding to the accelerator operation can be made as long as possible. Therefore, the impact caused by the shifting operation is mitigated by priority, for example, during high-speed driving, while the rider's acceleration request is handled by priority for example, during low-speed driving.

The motor controller may continue the rotational speed control until a predetermined condition is satisfied, and may switch the rotational speed control to the torque control when the predetermined condition is satisfied, after the manual transmission is shifted from the driving power cut-off state to the driving power transmission state.

In accordance with this configuration, the rotational speed control is continued until the predetermined condition is satisfied after the manual transmission is shifted from the driving power cut-off state to the driving power transmission state, it becomes possible to adequately lessen the angular velocity difference between the rotary members joined to each other in the shifting location of the manual transmission. As a result, the impact caused by the shifting operation can be suitably mitigated.

The motor controller may change the predetermined condition according to a driving state of the electric vehicle.

In accordance with this configuration, the timing at which the rotational speed control transitions to the torque control is adjusted according to the driving state of the electric vehicle. Therefore, the rotational speed control can smoothly transition to the torque control according to the driving state of the electric vehicle.

The motor controller may perform first torque control and then second torque control when the manual transmission is shifted from the driving power cut-off state to the driving power transmission state; and a changed amount of output torque which occurs per unit time until the output torque reaches a target output torque may be made less in the first torque control than in the second torque control.

In accordance with this configuration, when the manual transmission is shifted from the driving power cut-off state to the driving power transmission state, the first torque control which decreases an amount by which the torque is changed is performed before the second torque control is performed. Therefore, a response of the output value of the torque to the target torque becomes slow, and as a result, the impact caused by the shifting operation can be suitably mitigated.

The motor controller may change a degree to which the torque is suppressed in the first torque control or time for which the torque is suppressed in the first torque control, according to the driving state of the electric vehicle.

In accordance with this configuration, since the degree to which the torque is suppressed in the first torque control or the time for which the torque is suppressed in the first torque control is adjusted according to the driving state of the electric vehicle, the transition can occur smoothly according to the driving state of the electric vehicle.

Advantageous Effects of Invention

As should be appreciated from the foregoing, in accordance with the present invention, even when the shifting operation is performed in a state in which a portion of the driving power transmission path which is other than the manual transmission is in a connected state to allow the driving power to be transmitted, the electric motor is controlled so that impact caused by shifting of the driving power transmission path is mitigated. Therefore, the impact caused by the shifting operation can be mitigated even in an electric vehicle including a manual transmission.

BRIEF DESCRIPTION OF DRAWINGS

FIG. 5 is a map showing execution conditions of torque control and rotational speed control which are executed by the ECU of FIG. 4, corresponding to a low-speed driving state.

FIG. 6 is a map showing execution conditions of torque control and rotational speed control which are executed by the ECU of FIG. 4, corresponding to a high-speed driving state.

DESCRIPTION OF EMBODIMENTS

Hereinafter, an embodiment of the present invention will be described with reference to the drawings.

Figure 1:
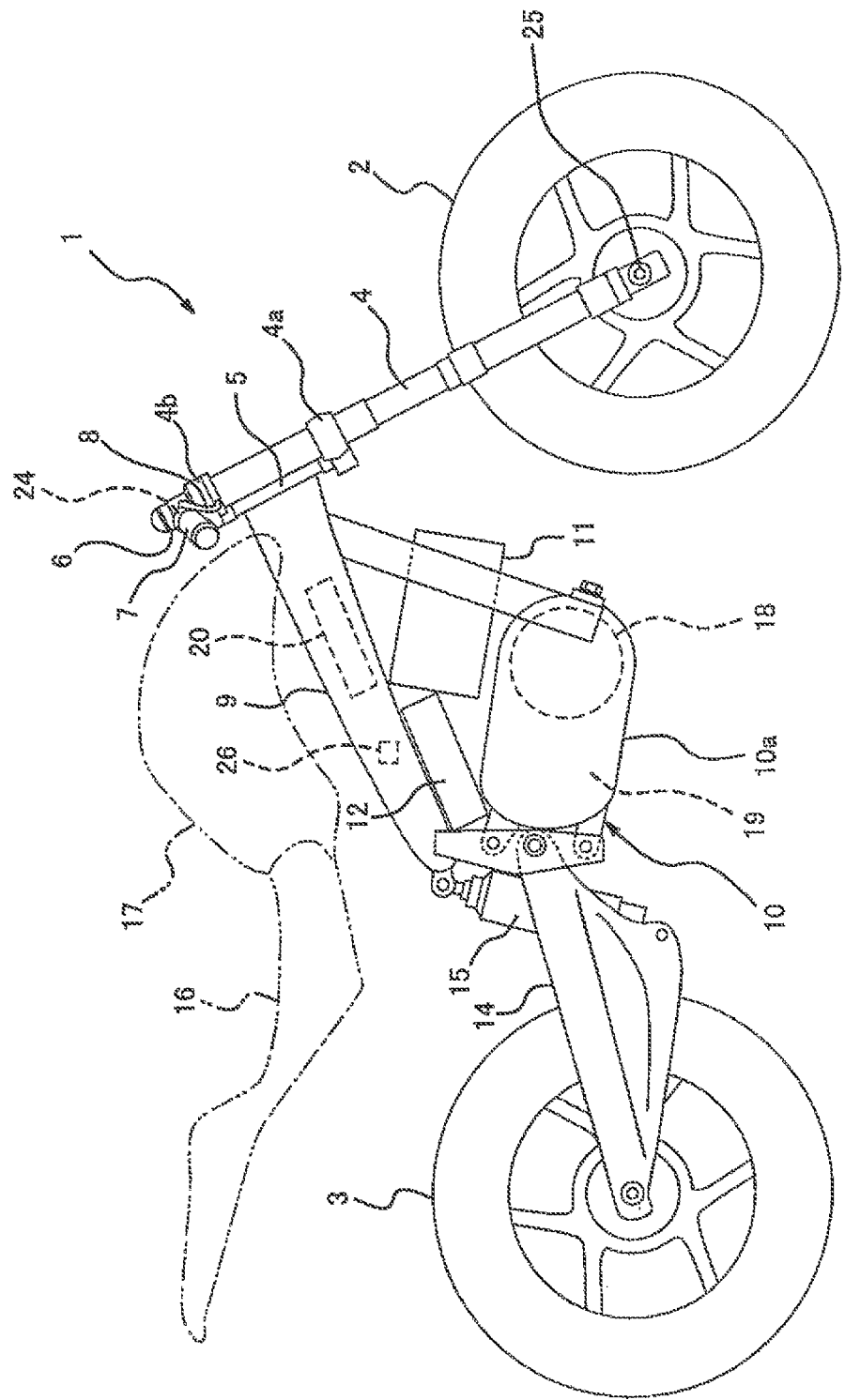
FIG. 1 is a right side view of an electric motorcycle according to an embodiment the present invention.

FIG. 1 is a right side view of an electric motorcycle 1 (electric vehicle) which is a motorcycle according to an embodiment the present invention. As shown in FIG. 1, the electric motorcycle 1 includes a front wheel 2 which is a driven wheel and a rear wheel 3 which is a drive wheel. The front wheel 2 is rotatably mounted to the lower end portion of a front fork 4, and the upper portion of the front fork 4 is mounted to a steering shaft (not shown) via a pair of upper and lower brackets 4a, 4b. The steering shaft is rotatably supported in a state in which the steering shaft is inserted into a head pipe 5 mounted to a vehicle body. A bar-type steering handle 6 extending in a rightward or leftward direction is mounted to the upper bracket 4b. The handle 6 is provided at a right side with an accelerator grip 7, which is gripped by a rider's right hand and rotated by twisting the rider's wrist. The handle 6 is provided with a brake operation member 8 (brake lever) in front of the accelerator grip 7. The handle 6 is provided at a left side with a fixed grip (not shown), which is gripped by the rider's left hand. The handle 6 is provided with a clutch operation member (clutch lever) which is not shown, in front of the fixed grip.

A driving power unit 10, a battery 11 and an inverter 12 are mounted to a vehicle body frame 9 of the electric motorcycle 1. The front portion of a swing arm 14 supporting the rear wheel 3 is mounted to the rear portion of the vehicle body frame 9 such that the swing arm 14 is pivotable around the front portion. A rear suspension 15 is interposed between the intermediate portion of the swing arm 14 and the vehicle body frame 9. As indicated by a virtual line of FIG. 1, a straddle seat 16 is disposed above the swing arm 14. The seat 16 is mounted to a seat rail (not shown) connected to the vehicle body frame 9. A dummy tank 17 is provided in front of the seat 16 such that the dummy tank 17 is retained by the rider's knees.

An electric motor 18 for generating driving power, and a manual transmission 19 for changing the speed of rotational power from the electric motor 18 and transmitting to the rear wheel 3 the rotational power with the changed speed, are stored in a case 10a of the driving power unit 1. The electric motor 18 generates the rotational power by electric power supplied from the battery 11 via the inverter 12. An ECU 20 (described later) is mounted to the vehicle body frame 9. The accelerator grip 7 is equipped with an accelerator displacement amount sensor 24 for detecting an accelerator displacement amount which is a parameter used to decide target torque of the electric motor 18. The front wheel 2 is equipped with a vehicle speed sensor 25 for detecting a front wheel rotational speed to detect a driving speed of the electric motorcycle 1. The driving speed may be derived from a rear wheel rotational speed instead of the front wheel rotational speed. The vehicle body frame 9 is equipped with a bank angle sensor 26 for detecting a bank angle of the vehicle body when the vehicle body is banked laterally from an upright position.

Figure 2:
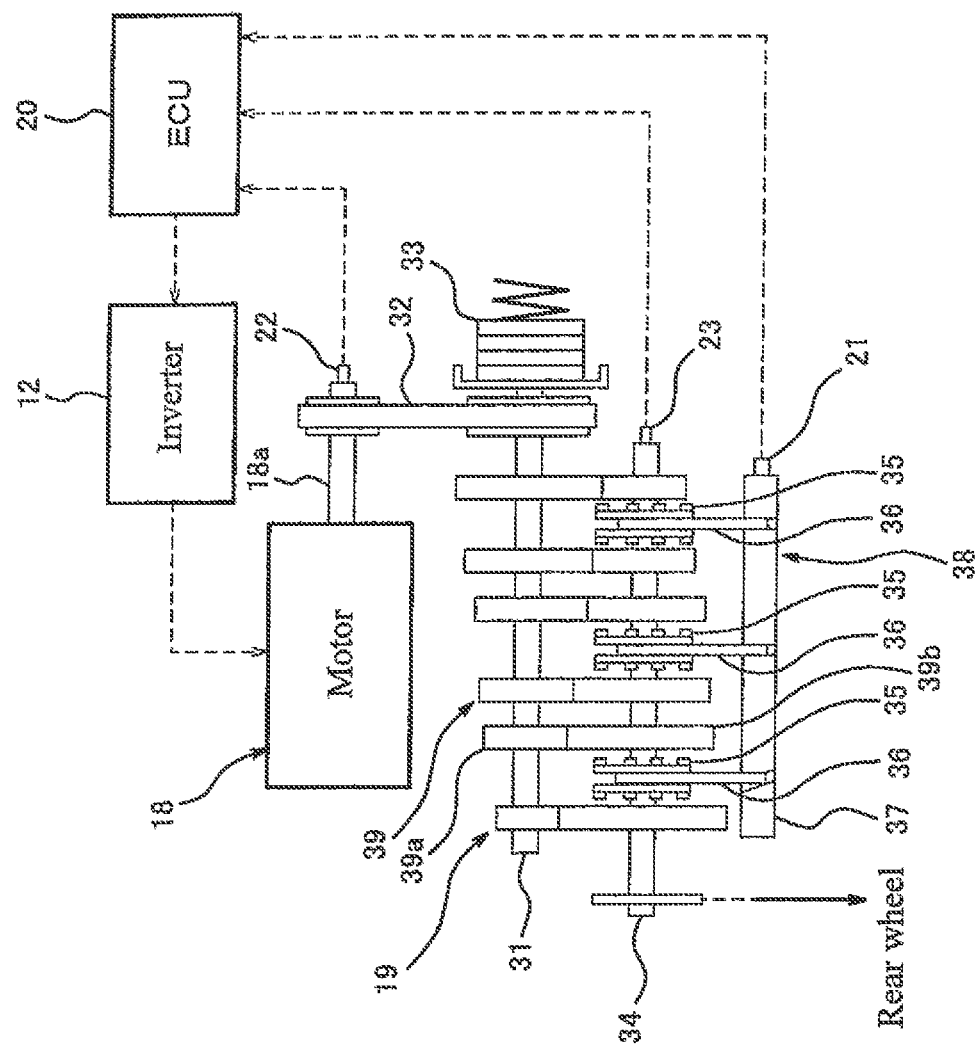
FIG. 2 is a schematic view showing a driving power transmission system of the electric motorcycle of FIG. 1.

FIG. 2 is a schematic view showing the driving power transmission system of the electric motorcycle 1 of FIG. 1. As shown in FIG. 2, an output shaft 18a of the electric motor 18 is coupled to an input shaft 31 of the manual transmission 19 via a driving power transmission mechanism 32 (e.g., pulley and belt mechanism) and a main clutch 33 (e.g., multiplate clutch) such that the driving power can be transmitted from the output shaft 18a to the input shaft 31. When the rider is operating the clutch operation member (not shown), the main clutch 33 is disengaged to inhibit the driving power of the electric motor 18 from being transmitted to the manual transmission 19. On the other hand, when the rider is not operating the clutch operation member (not shown), the main clutch 33 is engaged to permit the driving power of the electric motor 18 to be transmitted to the manual transmission 19. The input shaft 31 is joined to an output shaft 34 via plural sets of gear trains 39 which are different from each other in reduction gear ratio such that the driving power can be transmitted to the output shaft 34. Input gears 39a of the gear trains 39 are fastened to the input shaft 31 and are rotatable integrally with the input shaft 31. Output gears 39b of the gear trains 39 are attached to the output shaft 34 such that the output gears 39b are coaxial with the output shaft 34 and are rotatably fitted the output shaft 34. The input gears 39a and the output gears 39b are constantly in mesh. The end portion of the output shaft 34 is connected to the rear wheel 3 via a driving power transmission mechanism (e.g., chain and sprocket mechanism, which is not shown).

The manual transmission 19 is provided with a gear shifter 38 which operates mechanically in response to the rider's operation to select one from among the plural sets of gear trains 39, to shift a present driving power transmission path to the selected driving power transmission path. Thus, a shifting operation is performed. Plural transmission gear positions are set in the manual transmission 19. Any one of the gear positions can be independently selected by the manual operation. The gear shifter 38 includes dog gears 35 (also referred to as dog clutches) which are slidably mounted to the output shaft 34 and each of which is engageable with the selected one of the plural sets of gear trains 39, shift forks 36 each of which moves the corresponding dog gear 35 along the output shaft 34, and a shift drum 37 which moves one of the shift fork 36.

The shift drum 37 is equipped with a shift drum potentiometer 21 which is able to detect the rotational angle of the shift drum 37. Instead of the potentiometer, a standard gear position sensor may be used to detect a gear position. The output shaft 18a of the electric motor 18 is equipped with a motor rotational speed sensor 22 for detecting the rotational speed of the output shaft 18a. The output shaft 34 is equipped with an output shaft rotational speed sensor 23 for detecting the rotational speed of the output shaft 34. Although in the present example, the dog gears 35 are attached to the output shaft 34, they may be attached to the input shaft 31. The dog gears 35 are axially slidable on the output shaft 34 and are unmovable with respect to the output shaft 34 in a coaxial rotational direction.

Figure 3:
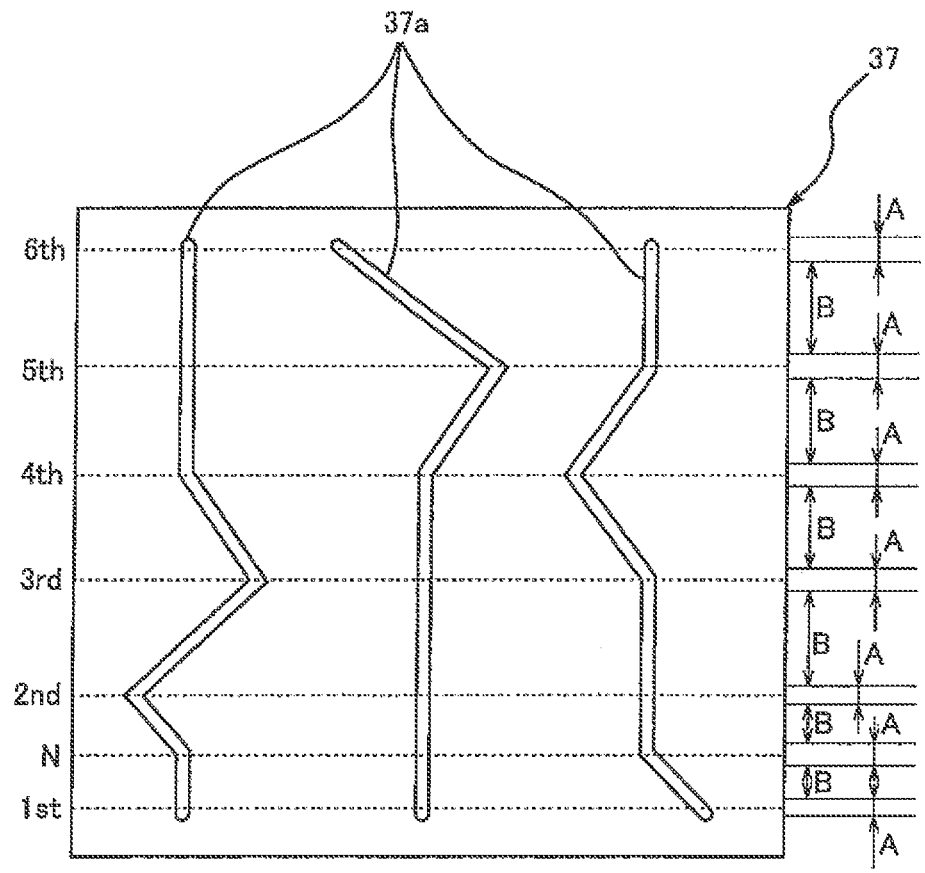
FIG. 3 is a development view of a shift drum of FIG. 2.

The outer peripheral surface of the shift drum 37 is provided with grooves 37a of a specified shape corresponding to the shift forks 36, respectively (see FIG. 3). Protrusions (not shown) at the base end portions of the shift forks 36 are slidably fitted to the grooves 37a of the shift drum 37, respectively. That is, the manual transmission 19 is configured to perform switching between a driving power transmission state in which the dog gear 35 is axially moved by the shift fork 36 and thereby is axially engaged with the output gear 39b such that they are integrally rotatable, and a driving power cut-off state in which the dog gear 35 is disengaged from the output gear 39b such that they are relatively rotatable.

First to sixth drum angle positions (first gear position to sixth gear position) corresponding to the transmission gear positions are set in the shift drum 37. At each drum angle position, only the corresponding one of the plural dog gears 35 is engaged with the corresponding output gear 39b and the remaining dog gears are disengaged from the corresponding output gears 39b, respectively. While the shift drum 37 is angularly displaced from a particular drum angle position to its adjacent drum angle position, the dog gear 35 and the output gear 39b, corresponding to the particular drum angle position, are disengaged from each other. After all of the dog gears 35 are disengaged from the output gears 39b, respectively, the dog gear and the output gear, corresponding to the adjacent drum angle position, are engaged with each other. As should be appreciated, in the middle of the shifting operation, there exists a driving power cut-off state in which all of the dog gears 35 are disengaged from the output gears 39b. It should be noted that in the middle of the shifting operation, the dog gears other than the dog gear to be engaged and the dog gear to be disengaged do not slide.

When the shift drum 37 rotates in response to the rider's operation of the shifting operation member, each shift fork 36 is guided to the groove 37a (see FIG. 3), and a desired shift fork 36 causes the dog gear 35 to slide along the output shaft 34. In this configuration, from among the plural sets of the input gears 39a and the output gears 39b, one set corresponding to the reduction gear ratio demanded by the rider is engaged with the dog gear 35, and as a result, the driving power transmission path of a desired gear position can be selected. Since a shifting timing is determined by the rider's manual operation, irrespective of an engine state, a great impact may be generated at the time of the shifting operation. Since the shifting operation is performed manually, it is likely that the reduction gear ratio changes significantly by the shifting operation performed once (e.g., the gear position is shifted from the first gear position to the third gear position or higher gear position beyond the second gear position). Therefore, a great impact may be generated at the time of the shifting operation. In addition, when the shift drum 37 is rotated rapidly from, for example, the first gear position to the third gear position, the driving power transmission path also rapidly changes sequentially from the first gear position to the third gear position, after going through the driving power cut-off state. The shifting operation member may be, for example, a shift pedal, a shift lever, etc., and may be operated by the rider's foot or hand.

Figure 4:
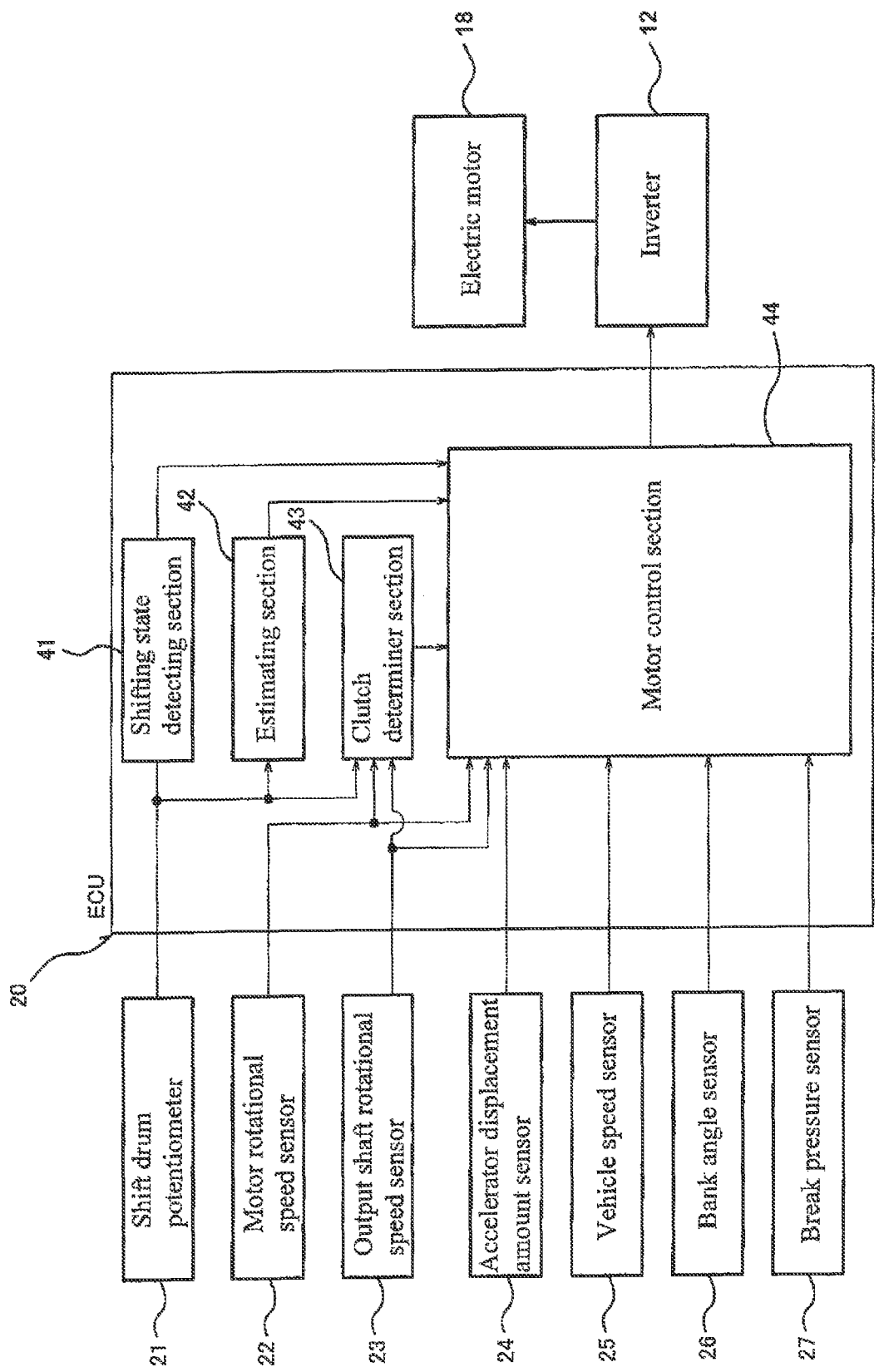
FIG. 4 is a block diagram showing an ECU of FIG. 2 and inputs/outputs of the ECU.

FIG. 4 is a block diagram showing an ECU 20 of FIG. 2 and inputs/outputs of the ECU 20. As shown in FIG. 4, the shift drum potentiometer 21, the motor rotational speed sensor 22, the output shaft rotational speed sensor 23, the accelerator displacement amount sensor 24, the vehicle speed sensor 25, the bank angle sensor 26, and a brake pressure sensor 27 are connected to the ECU 20 as inputs. The break pressure sensor 27 detects a brake operation amount (braking amount).

The ECU 20 includes a shifting state detecting section 41, an estimating section 42, a clutch determiner section 43, and a motor control section 44. The shifting state detecting section 41 detects the rotational angle (phase angle) of the shift drum 37 based on a signal value from the shift drum potentiometer 21 and determines a present gear position of the manual transmission 19. The gear positions include the plural gear positions (first gear position to sixth gear position) and a neutral position. The shifting state detecting section 41 sets therein predetermined determination zones A (see FIG. 3) corresponding to the respective gear positions, and dead zones B (see FIG. 3) each of which is present between adjacent determination zones, for the rotational angles of the shift drum 37 obtained from the potentiometer 21. Specifically, the shifting state detecting section 41 determines that the manual transmission 19 is in the driving power cut-off state in which the manual transmission 19 is shifting the driving power transmission path when the rotational angle of the shift drum 37 falls within the dead zone. On the other hand, the shifting state detecting section 41 determines that the manual transmission 19 has finished shifting of the driving power transmission path, when the rotational angle of the shift drum 37 falls within the determination zone.

More specifically, as shown in FIG. 3, each of the determination zones is set to a range which includes a rotational angle range of the shift drum 37 in a state in which the dog gear 35 is engaged with the gear train 39 and is set slightly greater than this rotational angle range. Each of the dead zones B is set to a rotational angle range which is other than the determination zone A, and in which all of the dog gears 35 are disengaged from the gear trains 39 in the middle of shifting of the gear position. Therefore, in the shifting operation, at a moment when the rotational angle of the shift drum 37 moves from the dead zone B to the determination zone A, the dog gear 35 is in a state just before it is about to be engaged with the gear train 39.

The determination zones A may be equal to each other in width. Or, the widths of the determination zones A may be set individually such that they are made different according to the characteristics of the gear positions. This makes it possible to perform each determination as to the shifting more accurately. The width of each of the determination zones A is set by utilizing a changing magnitude of the signal output from the potentiometer 21, which occurs when shifting to a particular gear position takes place, and other characteristics. The ECU 20 controls the electric motor 18 based on the gear position determined based on the signal value output from the potentiometer 21. By setting the dead zone B, it becomes possible to prevent a fluctuation in a determination result of the gear position within a very short time.

When the shifting state detecting section 41 detects the driving power cut-off state of the manual transmission 19, the estimating section 42 estimates the driving power transmission path to which the present driving power transmission path is to be shifted. Specifically, the estimating section 42 determines whether the gear position has been upshifted or downshifted based on whether a change rate of the signal value from the potentiometer 21 (change rate of rotational angle) is positive or negative. When the estimating section 42 determines that the gear position has been upshifted, it estimates that a gear position which is one-gear higher than a most recent gear position is the driving power transmission path to which the present driving power transmission path is to be shifted. On the other hand, when the estimating section 42 determines that the gear position has been downshifted, it estimates that a gear position which is one-gear lower than the most recent gear position is the driving power transmission path to which the present driving power transmission path is to be shifted.

The clutch determiner section 43 determines whether the main clutch 33 is in the driving power transmission state or in the driving power cut-off state. Specifically, the clutch determiner section 43 determines the operation state of the main clutch 33 based on the signal from the shift drum potentiometer 21, the signal from the motor rotational speed sensor 22, and the signal from the output shaft rotational speed sensor 23. When the clutch determiner section 43 determines that the manual transmission 19 is in a gear position and in the driving power transmission state, based on the signal value from the shift drum potentiometer 21, it determines that the main clutch 33 is in the driving power transmission state, if the rotational speed detected by the motor rotational speed sensor 22 and the rotational speed detected by the output shaft rotational speed sensor 23 are values corresponding to the reduction gear ratio in that gear position, and determines that the main clutch 33 is in the driving power cut-off state if the rotational speed detected by the motor rotational speed sensor 22 and the rotational speed detected by the output shaft rotational speed sensor 23 are not the values corresponding to the reduction gear ratio in that gear position. It should be noted that the clutch determiner section 43 may determine that the main clutch 33 is in the driving power transmission state when the gear position is the neutral position. In other words, mitigation control is not executed when the gear position is in the neutral position. For example, in the neutral position, control may be executed such that that the motor 18 is stopped. When the neutral position shifts to a driving power transmission position, the mitigation control is executed.

The clutch determiner section 43 may perform calculations based on a motor rotational speed M, a drive wheel rotational speed W, and a final reduction gear ratio α. Specifically, the clutch determiner section 43 may determine that the main clutch 33 is in the driving power cut-off state, when the manual transmission 19 is in the driving power transmission state and a difference between a value of M×α and a value of W is equal to or greater than a predetermined allowable error. Or, the clutch determiner section 43 may determine that the main clutch 33 is in the driving power cut-off state, when the rotational speed of a rotary member at an upstream side of the main clutch 33 in a driving power transmission direction, is not equal to the rotational speed of a rotary member at a downstream side of the main clutch 33 in the driving power transmission direction, in view of the reduction gear ratio, instead of using the drive wheel rotational speed and the final reduction gear ratio. For example, when a difference between a value of M×α0 and a value of I is equal to or greater than a predetermined allowable error based on the motor rotational speed M, a transmission input shaft I, and a reduction gear ratio from the motor 18 to a transmission input shaft α0, the clutch determiner section 43 may determine that the clutch 33 is in the driving power cut-off state. In this case, the driving power cut-off state of the clutch can be determined irrespective of the driving power transmission state of the transmission 19.

The motor control section 44 receives as inputs information from the shift drum potentiometer 21, the motor rotational speed sensor 22, the output shaft rotational speed sensor 23, the accelerator displacement amount sensor 24, the vehicle speed sensor 25, the bank angle sensor 26, the break pressure sensor 27, the shifting state detecting section 41, the estimating section 42, and the clutch determiner section 43, and controls the electric motor 18 via the inverter 12. Specifically, the motor control section 44 decides a control method of the electric motor 18 according to conditions described later and performs switching between the torque control and the rotational speed control. The torque control is such that output torque of the motor reaches a target value. Specifically, the torque control is a control method in which the target torque of the electric motor 18 is decided based on the information from the accelerator displacement amount sensor 24, with reference to a torque map indicating a correlation between the displacement amount of the accelerator operated by the rider and the target torque of the electric motor 18. The torque map is pre-stored in the ECU 20. The rotational speed control is such that the rotational speed of the motor output shaft reaches a target value. In the present embodiment, the torque control corresponding to the accelerator displacement amount is executed for a period except for at least a part of a shifting procedure. The target torque is torque which is set as a target in normal torque control, which is not transit control, and is a value found from computing equations or database (in the present example, torque map), based on vehicle state values and driving command values (accelerator opening degree, change rate of accelerator opening degree, driving speed, gear ratio).

The rotational speed control is exemplary mitigation control for mitigating an impact generated by shifting of the driving power transmission path of the manual transmission 19, as compared to the normal torque control. Specifically, in the rotational speed control, when it is detected that the manual transmission 19 is in the driving power cut-off state because of the shifting operation, the rotational speed of the electric motor 18 is controlled so that an input-side rotational speed of the dog gear 35 corresponding to the estimated gear position matches an output-side rotational speed of the dog gear 35, based on the reduction gear ratio corresponding to the next gear position estimated by the estimating section 42 and the output shaft rotational speed detected by the output shaft rotational speed sensor 23. Specifically, when the estimated reduction gear ratio is lower than the reduction gear ratio before shifting of the driving power transmission path, the electric motor 18 is controlled to reduce its rotational speed. On the other hand, when the estimated reduction gear ratio is higher than the reduction gear ratio before shifting of the driving power transmission path, the electric motor 18 is controlled to increase its rotational speed. This can lessen an angular velocity difference between the rotary members joined to each other in a shifting location (dog gear 35) of the manual transmission 19 just after the driving power transmission path has been shifted in the manual transmission 19. As a result, the impact can be suitably mitigated.

The timing at which the rotational speed control is initiated is set for each driving power transmission path. For example, the width (see FIG. 3) of the dead zone B and the threshold (step S11) of the shift drum angular velocity are set for each gear position. When the reduction gear ratio is higher, there is a possibility of successive shifting. In this case, therefore, the timing of the rotational speed control may be set so that the rotational speed control is initiated more easily and is finished less easily. This can reduce a possibility that the torque control is initiated in the middle of shifting of the gear position, which makes it easy for the rotational speed of the shaft 31 and the rotational speed of the shaft 34 to conform to each other. Or, driving conditions associated with acceleration after cornering during which the vehicle speed is reduced, starting, etc., may be determined. In the case of a high possibility of successive deceleration, the timing of the rotational speed control may be set so that the rotational speed control is initiated more easily and is finished less easily.

FIG. 5 is a map showing execution conditions of torque control and rotational speed control which are executed by the ECU 20 of FIG. 4, corresponding to a low-speed driving state. FIG. 6 is a map showing execution conditions of torque control and rotational speed control which are executed by the ECU 20 of FIG. 4, corresponding to a high-speed driving state. As shown in FIGS. 5 and 6, whether or not the state of the main clutch 33 should be considered to perform determination as to the switching between the torque control and the rotational speed control, is varied according to the driving state. Specifically, the condition used for switching between the torque control and the rotational speed control, is made different depending on whether the electric motorcycle is in a specified low-speed driving state or in a specified high-speed driving state. The low-speed driving state refers to at least one of a state in which the gear position detected by the shifting state detecting section 41 is a low gear position (e.g., 1st gear position to 3rd gear position), and a state in which the vehicle speed detected by the vehicle speed sensor 25 is equal to or higher than a predetermined speed (e.g., 40 km or higher), etc. The high-speed driving state refers to at least one of a state in which the gear position detected by the shifting state detecting section 41 is a high gear position (e.g., 4th gear position to 6th gear position), a state in which the vehicle speed detected by the vehicle speed sensor 25 is lower than a predetermined speed (e.g., lower than 40 km), etc.

As shown in FIG. 5, during the low-speed driving state, the torque control is executed when the manual transmission 19 is in the driving power transmission state, and the rotational speed control is executed when the manual transmission 19 is in the driving power cut-off state, irrespective of the state of the main clutch 33. As shown in FIG. 6, during the high-speed driving state, the torque control is executed when both of the manual transmission 19 and the main clutch 33 are in the driving power transmission state, and the rotational speed control is executed when the main clutch 33 is in the driving power cut-off state and the manual transmission 19 is in the driving power transmission state. In other words, the low-speed driving state is recognized as a torque priority condition, and the high-speed driving state is recognized as an impact mitigation priority condition. In this setting, when the driving state satisfies the impact mitigation priority condition, adequate rotational speed control is executed according to the state of the main clutch 33, and the impact caused by the shifting operation can be suppressed by priority. Or, when the driving state satisfies the torque priority condition, the state of the main clutch 33 is not considered so that the period of the rotational speed control can be made as short as possible, and the period of the torque control corresponding to the accelerator operation can be made as long as possible.

Figure 7:
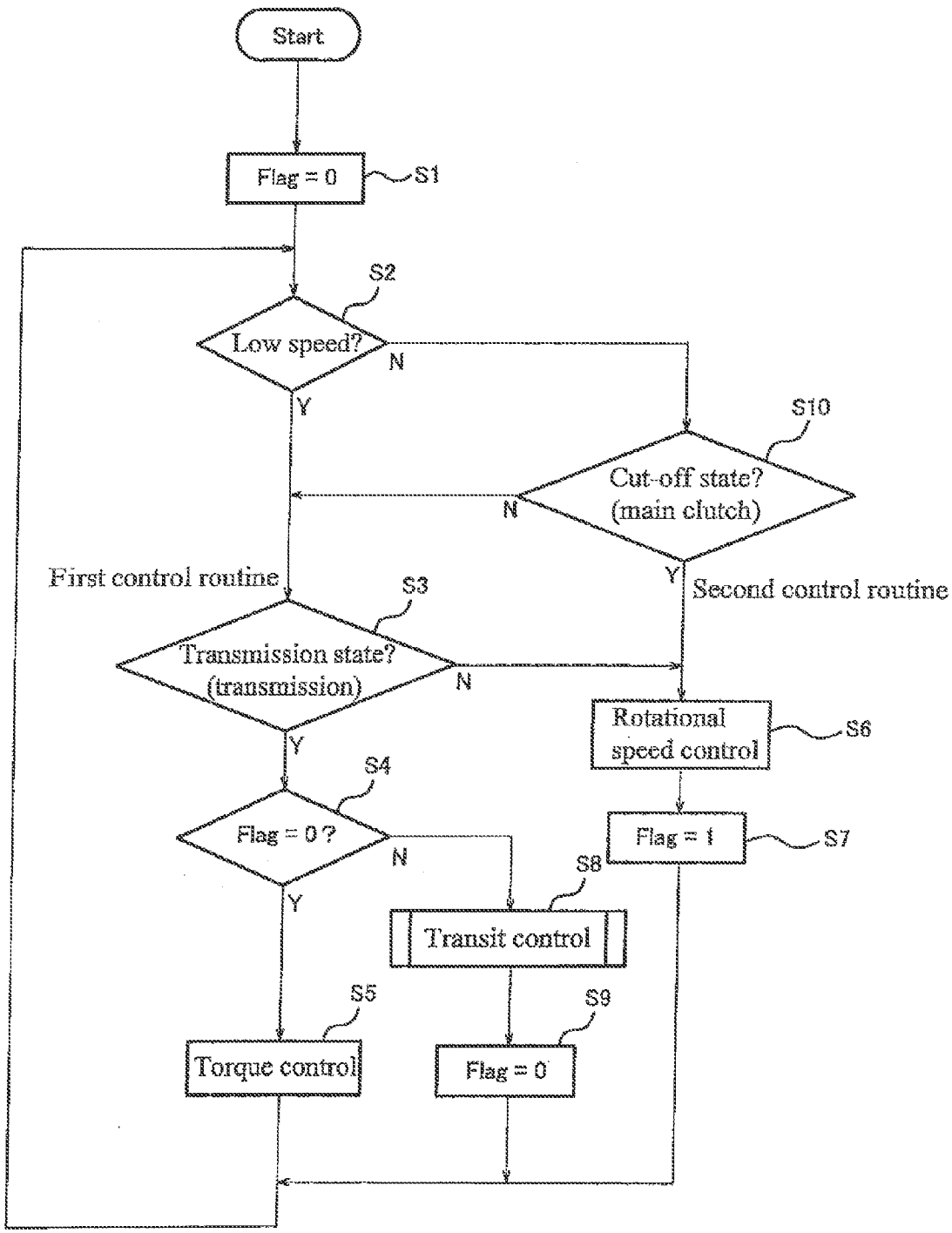
FIG. 7 is a flowchart showing control executed by the ECU of FIG. 4.

FIG. 7 is a flowchart showing the control executed by the ECU 20 of FIG. 3. As shown in FIG. 7, when a power supply of the electric motorcycle 1 is ON, the motor control section 44 sets a flag to "0" (step S1). Then, the motor control section 44 determines whether or not the electric motorcycle 1 is in the low-speed driving state (step S2). When the motor control section 44 determines that the electric motorcycle 1 is in the low-speed driving state, then it determines whether or not the manual transmission 19 is in the driving power transmission state (step S3). When the motor control section 44 determines that the manual transmission 19 is in the driving power transmission state, it determines whether or not the flag is "0" (step S4). When the motor control section 44 determines that the flag is "0", it executes the torque control (step S5), and returns to step S2.

When the motor control section 44 determines that the manual transmission 19 is in the driving power cut-off state because of the shifting operation, in step S3, it executes the rotational speed control (step S6), sets the flag to "1" (step S7), and returns to step S2. Then, when the manual transmission 19 returns from the driving power cut-off state to the driving power transmission state, a determination result is "Yes" in step S3, and a determination result is "No" in step S4. Therefore, the motor control section 44 executes transit control as will be described later (step S8), sets the flag to "0" (step S9), and returns to step S2. In other words, when the manual transmission 19 returns from the driving power cut-off state to the driving power transmission state, the rotational speed control is switched to the torque control through the transit control.

When the motor control section 44 determines that the electric motorcycle 1 is not in the low-speed driving state, i.e., in the high-speed driving state, in step S2, then it determines whether or not the main clutch 33 is in the driving power cut-off state (step S10). When the motor control section 44 determines that the main clutch 33 is not in the driving power cut-off state in step S10, it moves to step S3. On the other hand, when the motor control section 44 determines that the main clutch 33 is in the driving power cut-off state in step S10, it moves to step S6, and executes the rotational speed control.

As described above, steps S3 to S9 are executed when it is determined that the electric motorcycle 1 is in the low-speed driving state in step S2, and when it is determined that the main clutch 33 is in the driving power transmission state in step S10, construct a first control routine. Steps S6 and S7 are executed when the main clutch 33 is in the driving power cut-off state in step S10, and constructs a second control routine. Thus, even in the electric motorcycle 1 incorporating the manual transmission 19, the first control routine is able to mitigate the impact caused by the shifting operation irrespective of whether the main clutch 33 is engaged or disengaged (e.g., even when the main clutch 33 is in the driving power transmission state) when the shifting operation is performed. In the low-speed driving state, when the main clutch 33 is in the driving power cut-off state, but the manual transmission 19 is in the driving power transmission state, the torque of the electric motor 18 can be controlled. Therefore, the torque of the electric motor 18 can be controlled according to the rider's intention even when the main clutch 33 is in the driving power cut-off state. This makes it possible to increase motor torque in advance, when the main clutch 33 is in the driving power cut-off state, to improve an acceleration response which occurs, for example, when the main clutch 33 is returned to the driving power transmission state.

Figure 8:
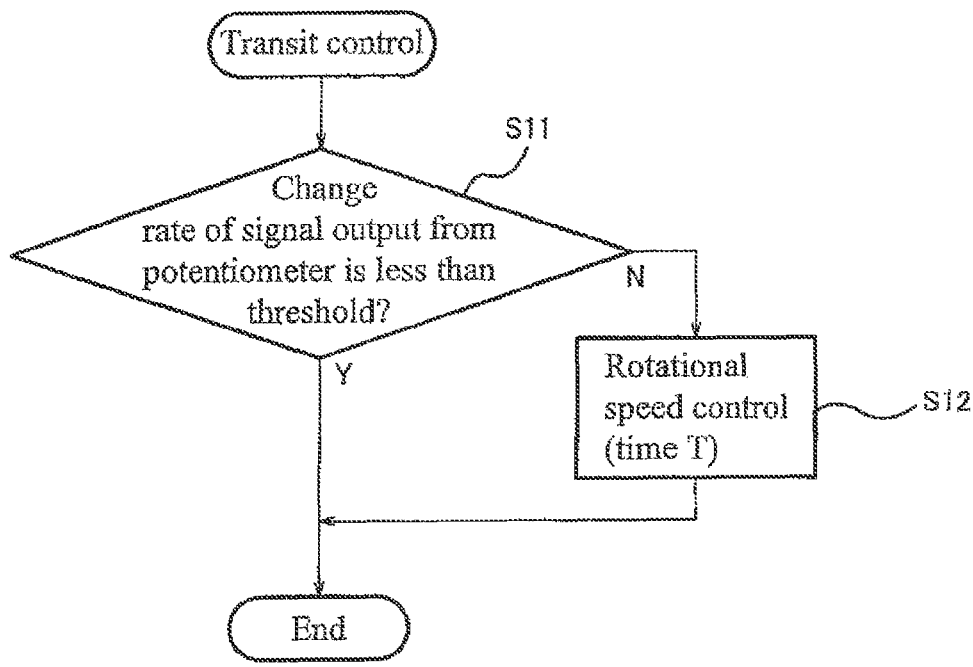
FIG. 8 is a flowchart showing transit control of FIG. 7.

FIG. 8 is a flowchart showing the transit control of FIG. 7. The transit control is set to mitigate the impact generated when the rotational speed control switches to the torque control. The transit control is configured so that a change rate of the torque which occurs until it reaches the target torque is made smaller by the execution of the transit control, than in the case where the normal torque control is executed just after shifting to the driving power transmission state has occurred. A case where the rotational speed control is executed in the middle of the transit control is included in a case where the change rate of the torque is made smaller.

As shown in FIG. 8, in the transit control, the motor control section 44 determines whether or not a change rate of the signal output from the shift drum potentiometer 21 in the shifting operation is less than a predetermined threshold (step S11). When the motor control section 44 determines that the change rate is not less than the predetermined threshold, i.e., the rider's shifting operation is too fast, the time for execution of the rotational speed control is too short. Therefore, the motor control section 44 continues to execute the rotational speed control (step S12). The rotational speed control in step S12 is executed for a predetermined time T. After a passage of the predetermined time T, the motor control section 44 terminates the transit control and moves to step S9 of FIG. 7.

As described above, when the rider's shifting operation is too fast, the rotational speed control (step S12) is executed as the transit control to extend the time for the whole rotational speed control. This can adequately reduce the angular velocity difference between the rotary members joined to each other via the dog gear 35 of the manual transmission 19, and make the time that passes until the output torque of the electric motor 18 reaches the target torque demanded by the rider longer than in a case where the transit control is not executed. Therefore, even in a case where the angular velocity difference between the dog gear 35 (downstream rotary member) and gear (upstream rotary member) on the output shaft 34 with which the dog gear 35 is engaged remains large, or a difference between the target torque and the output torque is large, when the manual transmission 19 shifts from the driving power cut-off state to the driving power transmission state, the impact generated when the rotational speed control transitions to the torque control can be mitigated (output torque is torque which is actually output from the motor).

Figure 9:
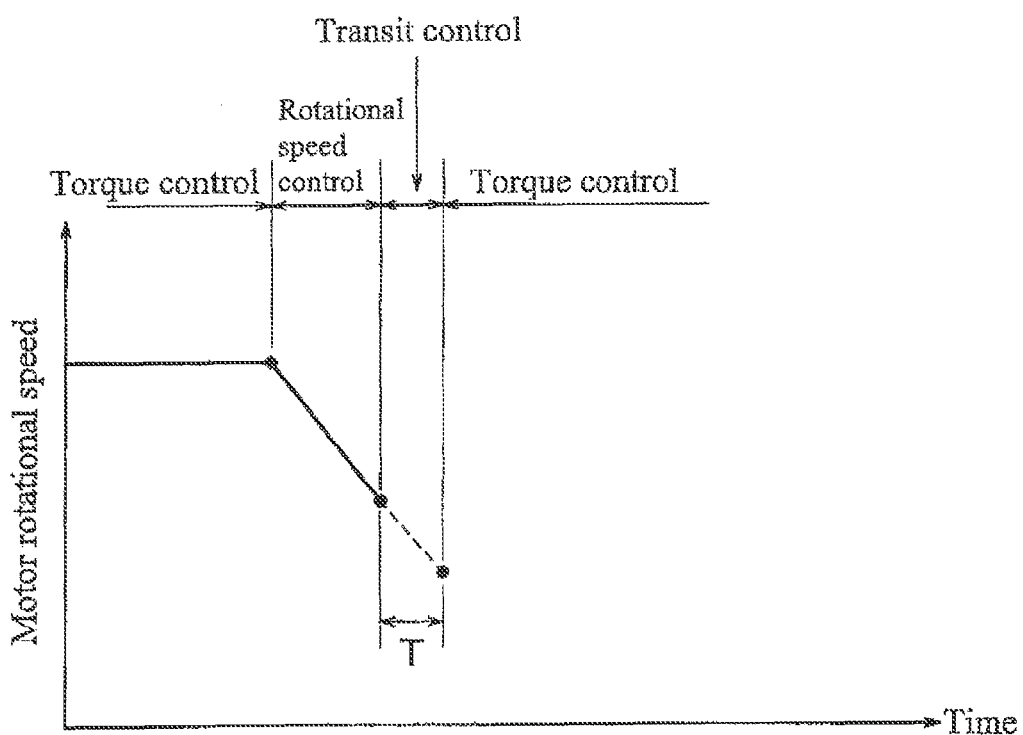
FIG. 9 is a graph showing a change in a motor rotational speed during shifting of the electric motorcycle of FIG. 1.

FIG. 9 is a graph showing a change in the motor rotational speed during the shifting operation of the electric motorcycle 1 of FIG. 1. FIG. 9 shows upshifting in a case where the accelerator displacement amount and the load applied to the rear wheel are assumed as constant. As shown in FIG. 9, in the transit control, when the execution time T of the rotational speed control is longer, the impact caused by the shifting operation can be adequately mitigated, while when the execution time T of the rotational speed control is shorter, the rotational speed control is quickly switched to the torque control, and torque response is improved. In light of this, the execution time T of the rotational speed control is variably set as a function of vehicle state value(s) and/or driving command value(s). In other words, the timing at which the rotational speed control transitions to the torque control is adjusted according to the vehicle state value(s) and/or the driving command value(s). The vehicle state value(s) mean(s) value(s) relating to the state of the vehicle which is/are changeable irrespective of the rider's driving command(s). The driving command value(s) mean(s) the value(s) of the command(s) provided by the rider to change the driving state of the electric motorcycle 1. Specifically, the vehicle state value(s) include(s) at least one of the values of a driving speed, a driving acceleration, a gear ratio, a motor rotational speed, an acceleration, a bank angle, etc., while the driving command value(s) include(s) at least one of the values (displacement/operation amount, displacement/operation amount change rate, displacement/operation timing) of the accelerator displacement amount, the gear position shifting operation, the clutch operation, the brake operation, etc. With this setting, it becomes possible to realize a good feeling according to the driving state of the vehicle and/or the rider's intention of the driving. For example, in a case where the parameter used for determining the target torque, such as the accelerator displacement amount, is increased or decreased significantly during the rotational speed control before the transit control, the impact generated when the rotational speed control transitions to the torque control can be mitigated.

As described above, since the transmission of the electric vehicle of the present embodiment is the manual transmission, it is more likely that the impact is generated when the electric motorcycle 1 shifts to the driving power transmission state, than in the electric motorcycle incorporating an automatic transmission. For example, if the manual transmission is operated quickly manually (e.g., with the rider's hand or foot), the time period for which the input-side rotational speed of the dog gear 35 and the output-side rotational speed of the dog gear 35 are caused to conform to each other in the rotational speed control, becomes short. Therefore, the present invention is effectively applicable to such a case. Or, if the accelerator displacement amount is changed rapidly while the shifting operation is performed slowly, the input-side rotational speed of the dog gear 35 and the output-side rotational speed of the dog gear 35 are caused to conform to each other in the rotational speed control, but the impact tends to be generated due to a torque difference. Therefore, the present invention is effectively applicable to such a case. Or, a great impact tends to be generated during the shifting operation, in the vehicle including the driven wheel 2 to which the driving power is not transmitted from the electric motor 18. Therefore, the present invention is effectively applicable to such a vehicle. Straddle vehicles (handle-bar-type vehicles) such as the motorcycle are smaller in weight than four-wheeled vehicles, and therefore, a great impact tends to be generated during the shifting operation, in such vehicles. Therefore, the present invention is effectively applicable to the straddle vehicles. In a case where the shifting operation is performed by the rider's foot, the shifting operation tends to be rough, and therefore a great impact is more likely to be generated. Therefore, the present invention is effectively applicable to such a vehicle.

Figure 10:
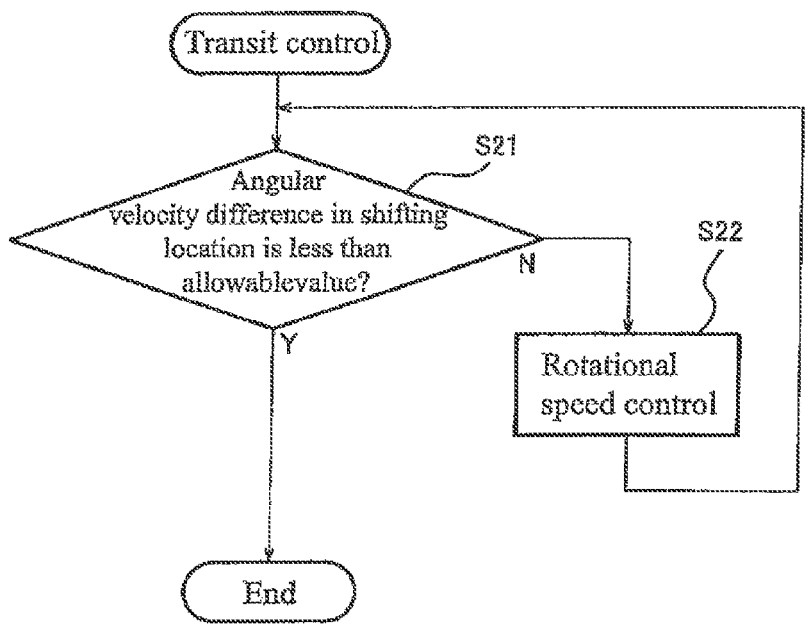
FIG. 10 is a flowchart showing another example of the transit control of FIG. 7.

FIG. 10 is a flowchart showing another example of the transit control of FIG. 7. As shown in FIG. 10, in the transit control of the present example, the motor control section 44 determines whether or not a difference in angular velocity between the upstream rotary member and the downstream rotary member, in the shifting location, during the shifting operation of the manual transmission 19, is less than a predetermined allowable value (step S21). When the angular velocity difference is not less than the predetermined allowable value, the execution time of the rotational speed control is too short, and therefore, the motor control section 44 continues to execute the rotational speed control (step S22), and returns to step S21. On the other hand, when the angular velocity difference is less than the predetermined allowable value, the motor control section 44 terminates the transit control, and moves to step S9 in FIG. 7 (transitions to the torque control (step S5)). Thus, after the difference in angular velocity between the upstream rotary member and the downstream rotary member, in the shifting location of the gear, in the manual transmission 19, has become smaller than the predetermined value, the transit control is terminated and transitions to the torque control. Therefore, the impact generated when the torque control is initiated can be mitigated stably.

Specifically, in a case where the rotational speed control is continued in the transit control, a case where the angular velocity difference or the torque difference is great, a case where the driving power is cut-off for a short time period, a case where the drum rotational angle velocity is equal to or greater than a predetermined value, or a case where a change in the accelerator displacement amount or the brake operation amount is great during a period of the shifting operation or at a time just before the period of the shifting operation, there is a high possibility that the input-side rotational speed of the dog gear 35 and the output-side rotational speed of the dog gear 35 do not conform to each other, in the rotational speed control. Therefore, in such cases, the time period of the transit control may be made longer. Or, in a case where the gear position is upshifted in a state in which the motor rotational speed is higher than a predetermined value set for each gear ratio, or a case where the gear position is downshifted in a state in which the motor rotational speed is lower than the predetermined value set for each gear ratio, there is a high possibility that inertia of the motor is excess and the input-side rotational speed of the dog gear 35 and the output-side rotational speed of the dog gear 35 do not conform to each other, in the rotational speed control. Therefore, in such cases, the time period of the transit control may be made longer.

Figure 11:
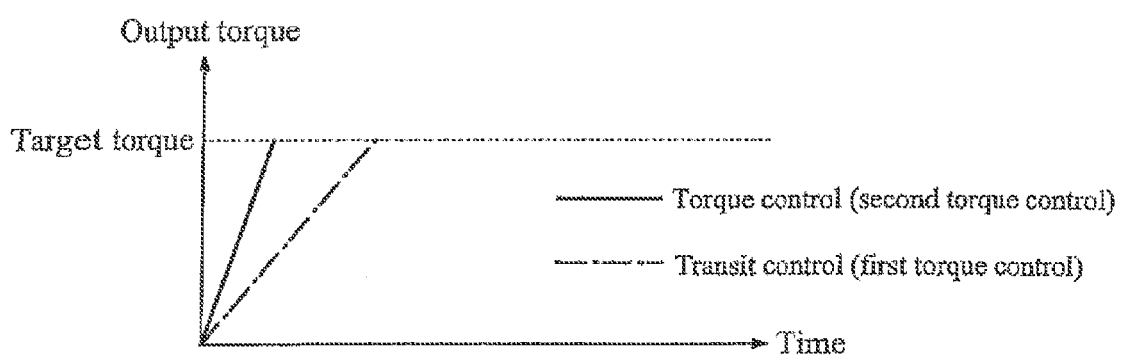
FIG. 11 is a graph showing another example of the transit control of FIG. 7.

FIG. 11 is a graph showing another example of the transit control of FIG. 7. As shown in FIG. 11, in the transit control of the present example, a change rate of the torque is set smaller than that in the case where the torque control is executed, and in this state, the electric motor 18 is controlled so that the output torque gradually gets closer to the target torque with time. In other words, the transit control in the present example is the first torque control, and the torque control (step S5), which follows the first torque control, is the second torque control. In the second torque control, the target torque is set irrespective of the shifting operation, while in the first torque control, the target torque, is set in association with the shifting operation. The change amount of the torque per unit of time which occurs until the output torque reaches the target torque is made less in the first torque control than in the second torque control. More specifically, the change amount of the torque per unit of time until the output torque reaches the target torque set in the second torque control just after the manual transmission 19 is shifted to the driving power transmission state, is made less in the first torque control than in a case where the second torque control is performed just after the manual transmission 19 is shifted to the driving power transmission state.

In other words, a control gain in the first torque control is set smaller than a control gain in the second torque control. In this setting, the time at which the output torque reaches the target torque demanded by the rider is made later in the transit control than in the torque control performed subsequently to the transit control. Therefore, in the transit control, a rapid change in the torque is suppressed while performing the torque control. As a result, both mitigation of the impact caused by the shifting operation and good drivability can be achieved. Alternatively, the first torque control may switch to the second torque control when a predetermined switching condition is satisfied. The degree to which the torque is suppressed in the transit control (first torque control) or its switching condition is changed according to the vehicle state value(s) and/or the driving command value(s). Since the degree to which the torque is suppressed in the transit control (first torque control) or its switching condition is adjusted according to the driving state of the electric motorcycle 1, the transition can smoothly occur according to the driving state. As a result, a good driving feel can be attained.

Alternatively, in the transit control (first torque control), the change rate of the torque may be changed in the shape of a quadratic curve so that the time at which the output torque reaches the target torque is made later. More specifically, the change rate of the torque in at least an initial stage of the transit control (first torque control) may be set smaller than the change rate of the torque in the torque control (second torque control). In other words, in the present example, the control gain in at least the initial stage of the transit control (first torque control) may be set smaller than the control gain in the second torque control.

Alternatively, the transit control (first torque control) may be implemented by continuously reducing the torque value or by intermittently skipping the torque output. Specifically, the output torque may be suppressed by continuously providing a value which is smaller than a normal torque value which may be used in the second torque control, or by alternately providing the normal torque value and the value which is smaller than the normal torque value. Or, the first torque control may be terminated before the torque reaches the target torque set in the second torque control. Instead of reducing the control gain, a time constant may be reduced to provide a lag characteristic. Or, an upper limit value may be set in the change of the torque per unit of time, or the output torque may be changed in a stepwise manner.

When the output torque reaches the target torque in the second torque control, the first torque control may transition to the second torque control. Or, the first torque control may transition to the second torque control at a time point when specified time has passed or when the torque is increased with a predetermined ratio in the second torque control even though the output torque does not reach the target torque yet in the second torque control. The condition used to make a transition from the first torque control to the second torque control, may be set according to the vehicle state or the operation state. For example, a specified condition may be set so that a first torque control period is reduced so long as the driving condition permits the impact caused by the shifting operation, to a certain degree.

The amount of the torque suppressed in the first torque control or the period for which the amount of the torque is suppressed in the first torque control, may be set greater, when a difference between the target torque and a present output torque or a difference in rotational speed between the output shaft and the input shaft is great. Or, in a case where it is estimated that the target torque is great, for example, a case where the driving speed is low, the reduction gear ratio is high, or a case where the amount of accelerator displacement for acceleration or a change in the amount of accelerator displacement for acceleration, which occurs with time, is great, the amount of the torque suppressed in the first torque control or the period for which the amount of the torque is suppressed in the first torque control, may be set greater. Or, in a case where it is determined that a wheel slip will occur when the target torque is provided, the torque may be suppressed to an amount which allows the wheel slip to be diminished.

The present invention is not limited to the above described embodiment, and its constituents may be changed, added or deleted without departing from the spirit of the invention. The embodiments may be combined as desired. For example, a part of the constituents or a method in one embodiment may be applied to another embodiment. For example, although in the above described embodiment, the electric motorcycle 1 is provided with the main clutch 33, the main clutch may be omitted. Although the clutch determiner section 43 determines the clutch state based on the signal from the shift drum potentiometer 21, the signal from the motor rotational speed sensor 22 and the signal from the output shaft rotational speed sensor 23, it may determine the clutch state based on a signal from a clutch switch for mechanically detecting the operation of the main clutch 33.

Instead of the output shaft rotational speed sensor 23, there may be provided a rotational speed sensor which is capable of detecting the rotational speed of the rotary member (e.g., rear wheel) which is located downstream of the dog gear 35 of the manual transmission 19 in the driving power transmission direction. In that case, the rotational speed of the output shaft may be calculated in view of the reduction gear ratio in a range from this rotary member to the output shaft. Or, the gear shifting mechanism of the manual transmission 19 need not be a dog gear method.

Although in the above described embodiment, the rotational speed control is executed so that the input-side rotational speed of the dog gear 35 corresponding to the estimated gear position matches the output-side rotational speed of the dog gear 35, in the mitigation control, it may be executed so that the input-side rotational speed gets close to the output-side rotational speed, instead of causing the input-side rotational speed to perfectly match the output-side rotational speed. Or, instead of executing the rotational speed control in the mitigation control, the torque of the electric motor 18 may be controlled to be reduced or may be controlled to reach zero, or otherwise, the electric motor 18 may be controlled to cancel the rotation inertia of the rotor of the electric motor. The first torque control in the transit control is not limited to the torque control shown in FIG. 11 so long as responsiveness of the actual motor output with respect to the target torque corresponding to a desired accelerator displacement amount is made slower.

Or, when it is determined that the manual transmission 19 is operated manually such that the angular velocity difference between the rotary members which are upstream and downstream of the shifting location in the driving power transmission path to which the present driving power transmission path is to be shifted, is reduced by the accelerator operation or the brake operation during the period of the shifting operation or a time point just before the period of the shifting operation, the degree to which the output torque is suppressed by the transit control may be lessened by reducing the transit period or by increasing the change rate of the torque.

Or, when it is determined that the acceleration should be performed by priority rather than giving a priority to the mitigation of the impact, based on the vehicle state value(s) or the driving state value(s), in a case where upshifting is performed in a state in which the driving speed is lower than a predetermined value or the gear ratio is lower, a case where upshifting of plural gear positions is performed, a case where the acceleration is greater than a predetermined value, or a case where a change in the amount of the accelerator displacement for acceleration, which occurs with time, is greater than a predetermined value, the period of the transit control may be reduced, the allowable angular difference or allowable torque difference used to transition to the torque control may be increased, or the change rate of the torque in the transit control may be increased. This makes it possible to meet the rider's demand which gives priority to the acceleration rather than the impact.

In a case where there are changes in parameters which increase the target torque (e.g., the gear ratio is low, the amount of the accelerator displacement for acceleration is changed greatly, the change rate of the amount of the accelerator displacement for acceleration is changed greatly, the driving speed is low, the vehicle body acceleration is equal to or less than then the predetermined value, the vehicle body bank angle is changed to be reduced, the break operation before shifting is performed, etc.), the amount of the torque to be suppressed may be increased, or the transit control period may be extended, thereby allowing the impact caused by the shifting operation to be mitigated. As described above, the content of the transit control, i.e., the amount of the output torque to be suppressed or the period for which the amount of the output torque is suppressed, may be changed based on at least one vehicle state value, among the values of the driving speed, the motor rotational speed, the gear ratio, the accelerator displacement amount, the break operation amount, the speed difference between the rotary members at the upstream and downstream sides of the shifting location, and the torque difference between the target value and the output value.

The present invention is applicable to the vehicle incorporating the manual transmission which is capable of shifting a change gear ratio from the electric motor to the drive wheel from a first change gear ratio to a second change gear ratio, via the driving power cut-off state. The present invention is applicable to a four-wheeled vehicle, a three-wheeled vehicle and personal watercraft, as well as a two-wheeled vehicle. The present invention is applicable to a hybrid vehicle including an internal combustion engine and an electric motor, or a fuel cell vehicle including a fuel cell as a power supply, so long as both of the rotational speed control and the torque control can be executed for the driving source for driving the drive wheel.

The transmission mechanism of the above embodiment may be merely exemplary, and another structure may be used. For example, a transmission mechanism in which the dog gears are placed at the input shaft may be used. Various existing structures of the arrangement or layout of the gears may be used, so long as the change gear ratio is shifted via the driving power cut-off state. Although the transmission which operates mechanically by the force exerted by the rider's operation of the shifting operation member has been described, the present invention is not limited to this. For example, the configuration in which an actuator operates electrically in response to the rider's operation of the shifting operation member to rotate the shift drum is included in the present invention.

Although in the present embodiment, the rotational speed control is initiated when the shift drum 37 is located in the dead zone B, it may be initiated before the shift drum 37 is located in the dead zone B. For example, when the absolute value of a change rate of an angular displacement which occurs with time, of an angular displacement member which is angularly displaced during the shifting operation of the shift drum 37, the shifting operation member (e.g., shift pedal), etc., exceeds a threshold, the driving power cut-off state of the transmission may be determined, and the rotational speed control may be initiated. In this case, the shifting operation is determined before the shift drum 37 is located in the dead zone B, and the rotational speed control can be initiated earlier in some cases. In this way, the motor rotational speed is caused to get close to the target value soon after, and the impact caused by the shifting operation can be mitigated.

In the present embodiment, since the timing at which the dog gear 35 and the gear 39b mesh with each other is determined by the rider's shifting operation, there may be a possibility that the dog gear 35 and the gear 39b mesh with each other in a state in which the rotational speed difference is great. In light of this, instead of the rotational speed control of the electric motor 18, the output torque of the electric motor 18 may be controlled in such a manner when the rotational speed difference based on the rotational speed of the shift drum 37 is equal to or greater than a predetermined value, the output torque reaches zero or gets close to zero at the timing at which the convex and concave portions of the dog gear 35 and of the gear 39b will mesh with each other. Thus, in a case where the main clutch 33 is not provided, or is in the driving power transmission state, it becomes possible to mitigate the impact caused by the shifting operation in a state in which the convex and concave portions of the dog gear 35 and the gear 39b do not mesh with each other, or the rotational speed difference is great.

Although in the present embodiment, the driving power cut-off state of the transmission manual 19 is determined using the potentiometer 21, it may be determined using another means. For example, instead of the shift drum potentiometer 21, a gear position sensor (contact-type resistive sensor) may be used. Specifically, in a case where it can be determined that the dog gear is in the shift drum position in which the dog gear meshes with the gear, using the gear position sensor, the driving power cut-off state of the manual transmission may be determined, by detecting that the shift drum is displaced to an angular position which is different from the gear position or is deviated from the gear position, based on the signal value from the gear position sensor.

In a case where the force for the shifting operation is transmitted from the shifting operation member to the shift drum 37, a load sensor (load cell) attached on the driving power transmission path in a location which is between the shifting operation member and the shift drum 37, may be used. Specifically, a change in the load applied to the driving power transmission path, which is caused by the shifting operation, may be detected, and the driving power cut-off state of the transmission 19 may be determined. Or, the driving power cut-off state of the transmission may be determined, using a detected value of a sensor for detecting the angular position of the angular displacement member which is angularly displaced in response to the shift drum 37, for example, the change drum.

Or, the driving power cut-off state of the transmission may be determined, based on the rotational speed difference between the input shaft 31 and the output shaft 34. Specifically, a sensor for detecting the rotational speed of the shaft 31 and a sensor for detecting the rotational speed of the shaft 34 may be provided. It may be determined that the transmission 19 is in the driving power transmission state, when the rotational speed difference between the shafts, which is derived in view of the reduction gear ratio, exceeds a predetermined value. Or, instead of the rotational speed of the output shaft 34, the rotational speed of a rotary member which is downstream of the output shaft 34 in the driving power transmission direction, may be used. For example, the rotational speed of the output shaft 34 may be calculated based on the value of a rotational speed sensor of the drive wheel, in view of the reduction gear ratio. In a case where the main clutch is not provided, the rotational speed of the input shaft 31 may be calculated in view of the reduction gear ratio, based on the rotational speed of a rotary member which is upstream of the input shaft 31 in the driving power transmission direction, for example, the motor output shaft, instead of directly using the rotational speed of the input shaft 31. In a case where the main clutch is provided, the rotational speed of the input shaft 31 may be calculated in view of the reduction gear ratio, based on the rotational speed of a rotary member which is upstream of the main clutch in the driving power transmission direction, if it is determined that the main clutch is in the driving power transmission state.

Regarding estimation of the driving power transmission path, it is determined that the upshifting has been performed when the absolute value of the change rate of the signal output from the potentiometer 21, which occurs with time, exceeds the predetermined value and is positive, while it is determined that the downshifting has been performed when the absolute value exceeds the predetermined value and is negative. In addition, the rotational angle of the shift drum 37 is used. However, the present invention is not limited to this. For example, it may be determined whether the rotational direction of the shift drum 37 or the rotational direction of the angular displacement member which is angularly displaced in response to the rotation of the shift drum 37, such as the change lever, is the rotational direction which increases the reduction gear ratio, or the rotational direction which decreases the reduction gear ratio. Or, the driving power transmission path to which the present driving power transmission path is to be shifted may be estimated based on the operation of another operation means. For example, the operation (brake operation, ON-operation of turn signal during low-speed driving) associated with deceleration and the driving state associated with deceleration, may be determined before the shifting operation occurs, and it may be determined that the downshifting has been performed. Thus, it may be estimated that shifting to the path at which the reduction gear ratio is higher has occurred. For example, when the transmission shifts to the driving power cut-off state by the clutch operation, after the vehicle speed has been decreased as a result of the brake operation or the like, it may be determined that the downshifting has been performed. In the same manner, when the transmission shifts to the driving power cut-off state by the clutch operation, after the vehicle speed has been increased as a result of the acceleration operation or the like, it may be determined that the upshifting has been performed.

Although in the above embodiment, switching between the rotational speed control and the torque control is performed according to the driving power cut-off state associated with the transmission, it may be performed according to the driving power cut-off state associated with the clutch. Or, although in the above described embodiment, the transit control is performed, it may not be performed or the transition period may be set shorter, if the angular difference or the torque difference is smaller than a predetermined value. Or, in the transit control, the rotational speed control and the torque suppressing control may be performed sequentially. This makes it possible to suppress the impact more effectively. Or, switching between the rotational speed control and the torque suppressing control may be performed according to cases. Or, the angular difference and the torque difference may be compared to each other, and then a ratio of the rotational speed control may be increased when it is determined that the impact corresponding to the angular difference is great, while a ratio of the torque suppressing control may be increased when it is determined that the impact corresponding to the torque difference is great. In the case of a vehicle which enables the shifting operation and the clutch operation, the rotational speed control or the transit control may continue during a time period when at least one of the shifting operation and the clutch operation causes the driving power cut-off state. This allows the rider's intention to be reflected on the motor control. For example, in the driving power cut-off state caused by the shifting operation, the rotational speed control may be performed, while in the driving power cut-off state caused by the clutch operation, the transit control may be performed.

Or, when it is determined that the electric motorcycle 1 in a stopped state is going to start, based on the driving state (e.g., a change in vehicle speed, motor rotational speed, gear ratio, accelerator displacement amount, etc., which occurs with time), it may be determined that upshifting is more likely to be performed, and thereby it may be estimated that shifting to the driving power transmission path in which the reduction gear ratio is lower has occurred by the shifting operation. For example, when the accelerator operation member is operated to accelerate the vehicle in a state in which the driving speed is equal to or lower than a predetermined driving speed before the shifting operation occurs, it may be determined that the shifting operation in starting has occurred, and it may be determined that upshifting has been performed. Thereby, it may be estimated that shifting to the driving power transmission path in which the reduction gear ratio is lower has occurred by the shifting operation.

Or, the driving condition (e.g., driving condition indicating an ascending slope, acceleration, overtaking, etc.), which may require the output torque in the shifting operation may be determined, and it may be determined that downshifting has been performed. Thereby, it may be estimated that shifting to the driving power transmission path in which the reduction gear ratio is higher has occurred by the shifting operation. Or, the driving condition (e.g., driving condition indicating a descending slope, constant-speed driving), which may require a reduction in the output torque in the shifting operation may be determined, and it may be determined that the upshifting has been performed. Thereby, it may be estimated that shifting to the driving power transmission path in which the reduction gear ratio is lower has occurred by the shifting operation.

In a case where the gear position is the neutral position and the rotational speed of the input shaft is high relative to the driving speed, the rotational speed of the motor may be controlled to reduce the rotational speed of the input shaft. For example, in a case where the gear position is the neutral position, the vehicle is in a stopped state, and the rotational speed of the input shaft is higher than an idling rotational speed, the rotational speed of the motor may be controlled so that the rotational speed of the input shaft gets close to the idling rotational speed. Or, a history of the shifting operation in the past and the corresponding driving states may be stored, and a change gear ratio which will be selected may be estimated based on the stored values using learning control. Thus, instead of the rotational speed of the shift drum, the driving power transmission path to which the present driving power transmission path is to be shifted by the shifting operation may be estimated based on the driving state of the vehicle or the rider's operation.

Furthermore, the torque control is not limited to the torque control in which the torque of the motor is controlled with reference to the map indicating the correlation between the acceleration displacement amount and the target torque, it may be such that the output torque corresponding to the rider's accelerator request can be attained. The target torque may be set based on parameters such as the change rate of the accelerator displacement amount which occurs, the change gear ratio, the driving speed, or the motor rotational speed, instead of the accelerator displacement amount. Or, the target torque may be compensated based on the state of the vehicle. For example, in a case where the SOC of the battery is less, or a battery temperature is high, the output torque may be set such that the target torque value may be made smaller than that of the torque demanded by the rider. Or, instead of the map, calculation formulas using the parameters as coefficients may be used.

Furthermore, in the present embodiment, when the ECU 20 determines the driving power cut-off state caused by the shifting operation, it switches the rotational speed control between execution and non-execution based on the driving state and the operation condition. The ECU 20 continues to perform the torque control without performing the rotational speed control based on particular conditions according to the clutch operation and the driving speed. Or, the ECU 20 may perform the control other than the rotational speed control (mitigation control) when it is determined that the transmission is in the driving power cut-off state and another torque priority condition of the above conditions is satisfied. Or, in a case where the driving speed is higher than a predetermined value, the motor rotational speed is high, or the change gear ratio is low, in a state in which the accelerator displacement amount before the shifting operation is small, the torque control may be continued in the driving power cut-off state in the shifting.

Furthermore, in a case where the rotational speed difference between the input shaft 31 and the output shaft 34 is within a predetermined allowable range and the impact caused by the shifting operation is small, the torque control may be continued. For example, in view of the magnitude of the relationship of a reduction gear ratio difference in the shifting, the predetermined allowable range may be set for each change gear ratio based on a difference between the reduction gear ratio before the shifting and the reduction gear ratio after the shifting. In a case where the impact caused by the shifting operation is permitted, for example, a circuit driving mode is selected, the predetermined allowable range may be increased. Or, the predetermined allowable range may be set according to the rider's request. Or, regenerative control may be effectively performed, for example, in a case where the SOC is less. As should be understood, even in a case where the clutch is not provided, the torque priority condition may be set according to the driving state or the operation state.

Moreover, the rotational speed control or the transit control as the first torque control may be continued until a specified condition is satisfied. Thus, the transit control (rotational speed control or first torque control) may be continued until the predetermined condition which will mitigate the impact if the transmission 19 shifts to the driving power transmission state is satisfied. For example, as described above, the transit control may be continued in the driving power transmission state of the transmission 19, when the change rate of the rotational speed of the shift drum 37 of FIG. 8, or the rotational speed difference between the input shaft 31 and the output shaft 34, of FIG. 10 is equal to or greater than the allowable value. Or, the change rate of the rotational speed of the shift drum 37 at which the transit control is terminated, or the allowable value of the rotational speed difference between the input shaft 31 and the output shaft 34, may be set for each change gear ratio. For example, a smaller allowable value may be set for a higher change gear ratio. Or, the transit control may be continued until the amount of the output to be increased to attain the target torque with respect to present output torque becomes less than a predetermined value. Or, it may be determined whether or not to continue or terminate the transit control based on the magnitude relationship of the driving speed or of the change in the driving speed, which occurs with time. Thus, the particular condition used to switch from the transit control to the torque control may be set based on the driving state or the operation state. For example, the transit control may return to the torque control based on at least one driving condition, from among, for example, the driving speed, the driving acceleration, the gear position, the accelerator displacement amount, and the vehicle body bank angle.

Moreover, the mitigation control may be initiated when it is determined that the transmission 19 will shift to the driving power transmission state before it shifts to the driving power cut-off state. This makes it possible to execute the shifting earlier while avoiding the impact caused by the shifting operation. For example, based on the shifting command, the rotational speed difference, the change rate of the rotational speed of the shift drum, etc., the rotational speed control may be initiated before an intermediate position between adjacent gear positions is reached.

INDUSTRIAL APPLICABILITY

As described above, the electric vehicle of the present invention can achieve advantages that it is possible to, when the transmission shifts from the driving power cut-off state to the driving power transmission state, mitigate the impact generated when the rotational speed control transitions to the torque control, even in a case where there is a great difference in angular velocity between the upstream rotary member and the downstream rotary member, or there is a great difference between the target torque and the output torque, and is widely applicable to an electric motorcycle or the like which can achieve the advantages.

REFERENCE CHARACTERS LIST

1 electric motorcycle (electric vehicle)
3 rear wheel (drive wheel)
18 electric motor
19 manual transmission
33 main clutch
41 shifting state detecting section (shifting state detecting device)
42 estimating section (estimating device)

43 clutch determiner section
44 motor control section (motor controller)

The invention claimed is:

1. An electric vehicle comprising:
an electric motor for generating driving power transmitted to a drive wheel via a driving power transmission path;
a manual transmission which includes an input shaft and an output shaft, selects one driving power transmission path from among plural driving power transmission paths in response to a rider's operation and shifts, by using a force of the rider's operation as a shifting force, a present driving power transmission path to the selected driving transmission path through a driving power cut-off state in which driving power is inhibited from being transmitted between the input shaft and the output shaft, for changing a speed of the driving power from the electric motor;
a shifting state detecting device for detecting whether the manual transmission is in a driving power transmission state in which the manual transmission has completed shifting of the driving power transmission path or in a driving power cut-off state in which the manual transmission is shifting the driving power transmission path; and
a motor controller for executing a first control routine to control the electric motor;
wherein in the first control routine, torque control of the electric motor is performed when the shifting state detecting device detects that the manual transmission is in the driving power transmission state, and mitigation control of the electric motor is performed to mitigate an impact caused by shifting of the driving power transmission path, when the shifting state detecting device detects that the manual transmission is in the driving power cut-off state, the mitigation control being different from the torque control.

2. An electric vehicle comprising:
an electric motor for generating driving power transmitted to a drive wheel via a driving power transmission path;
a manual transmission which selects one driving power transmission path from among plural driving power transmission paths and shifts a present driving power transmission path to the selected driving transmission path, in response to a rider's operation for changing a speed of the driving power from the electric motor;
a shifting state detecting device for detecting whether the manual transmission is in a driving power transmission state in which the manual transmission has completed shifting of the driving power transmission path or in a driving power cut-off state in which the manual transmission is shifting the driving power transmission path;
a motor controller for executing a first control routine to control the electric motor; and
an estimating device for estimating the driving power transmission path to which the present driving power transmission path is to be shifted, when the shifting state detecting device detects that the manual transmission is in the driving power cut-off state;
wherein in the first control routine, torque control of the electric motor is performed when the shifting state detecting device detects that the manual transmission is in the driving power transmission state, and mitigation control of the electric motor is performed to mitigate an impact caused by shifting of the driving power transmission path, when the shifting state detecting device detects that the manual transmission is in the driving power cut-off state, the mitigation control being different from the torque control; and
wherein the mitigation control is rotational speed control of the electric motor based on a reduction gear ratio in the estimated driving power transmission path of the manual transmission, and a rotational speed of a rotary member which is located downstream of a shifting location of the driving power transmission path of the manual transmission, in a driving power transmission direction.

3. The electric vehicle according to claim 2,
wherein in the rotational speed control,
the electric motor is controlled such that the rotational speed is reduced when a reduction gear ratio estimated by the estimating device is lower than the reduction gear ratio before shifting of driving power transmission path, and
the electric motor is controlled such that the rotational speed is increased when the reduction gear ratio estimated by the estimating device is higher than the reduction gear ratio before shifting of driving power transmission path.

4. The electric vehicle according to claim 2, further comprising:
a clutch which is capable of inhibiting the driving power from being transmitted between the electric motor and the manual transmission;
wherein the motor controller is capable of executing the first control routine irrespective of an operation state of the clutch.

5. The electric vehicle according to claim 2, further comprising:
a clutch which is capable of inhibiting the driving power from being transmitted between the electric motor and the manual transmission; and
a clutch determiner device for determining whether the clutch is in the driving power transmission state or in the driving power cut-off state;
wherein the motor controller executes the first control routine when the clutch determiner device determines that the clutch is in the driving power transmission state, and executes a second control routine when the clutch determiner device determines that the clutch is in the driving power cut-off state; and
wherein the motor controller performs the rotational speed control of the electric motor in the second control routine.

6. The electric vehicle according to claim 5,
wherein the motor controller performs switching between the first control routine and the second control routine based on an operation state of the clutch when it is detected that a driving state satisfies a predetermined impact mitigation priority condition, and executes the first control routine irrespective of the operation state of the clutch when it is detected that the driving state satisfies a predetermined torque priority condition.

7. The electric vehicle according to claim 2,
wherein after the manual transmission is shifted from the driving power cut-off state to the driving power transmission state,
the motor controller continues the rotational speed control until a predetermined condition is satisfied, and switches the rotational speed control to the torque control when the predetermined condition is satisfied.

8. The electric vehicle according to claim 7,
wherein the motor controller changes the predetermined condition according to a driving state of the electric vehicle.

9. An electric vehicle comprising:
an electric motor for generating driving power transmitted to a drive wheel via a driving power transmission path;
a manual transmission which selects one driving power transmission path from among plural driving power transmission paths and shifts a present driving power transmission path to the selected driving transmission path, in response to a rider's operation for changing a speed of the driving power from the electric motor;
a shifting state detecting device for detecting whether the manual transmission is in a driving power transmission state in which the manual transmission has completed shifting of the driving power transmission path or in a driving power cut-off state in which the manual transmission is shifting the driving power transmission path; and
a motor controller for executing a first control routine to control the electric motor;
wherein in the first control routine, torque control of the electric motor is performed when the shifting state detecting device detects that the manual transmission is in the driving power transmission state, and mitigation control of the electric motor is performed to mitigate an impact caused by shifting of the driving power transmission path, when the shifting state detecting device detects that the manual transmission is in the driving power cut-off state, the mitigation control being different from the torque control;
wherein the motor controller performs first torque control and then second torque control when the manual transmission is shifted from the driving power cut-off state to the driving power transmission state; and
wherein a change amount of output torque which occurs per unit time until the output torque reaches a target torque is made less in the first torque control than in the second torque control.

10. The electric vehicle according to claim 9,
wherein the motor controller changes a degree to which the torque is suppressed in the first torque control or time for which the torque is suppressed in the first torque control, according to a driving state of the electric vehicle.

* * * * *